US010223325B2

(12) United States Patent
Lawrence

(10) Patent No.: US 10,223,325 B2
(45) Date of Patent: Mar. 5, 2019

(54) ELECTRONIC DEVICE FOR MEASURING THE RELATIVE FORCE ACTING UPON A SAIL

(71) Applicant: Jeffrey A Lawrence, Hartford, WI (US)

(72) Inventor: Jeffrey A Lawrence, Hartford, WI (US)

( * ) Notice: Subject to any disclaimer, the term of this patent is extended or adjusted under 35 U.S.C. 154(b) by 1123 days.

(21) Appl. No.: 13/721,148

(22) Filed: Dec. 20, 2012

(65) Prior Publication Data

US 2014/0180608 A1    Jun. 26, 2014

(51) Int. Cl.
| | | |
|---|---|---|
| *G01L 1/00* | (2006.01) | |
| *G01L 3/00* | (2006.01) | |
| *G01L 5/00* | (2006.01) | |
| *G06F 15/00* | (2006.01) | |
| *G01L 5/13* | (2006.01) | |
| *B63H 9/04* | (2006.01) | |

(52) U.S. Cl.
CPC .............. *G06F 15/00* (2013.01); *B63H 9/04* (2013.01); *G01L 5/00* (2013.01); *G01L 5/13* (2013.01)

(58) Field of Classification Search
CPC .. G01L 5/00; G01L 5/0047; G01N 2203/0023
USPC .......................................................... 702/42
See application file for complete search history.

(56) References Cited

U.S. PATENT DOCUMENTS 4,436,047 A * 3/1984 Freyrie ............... B63B 35/7973
114/102.12
4,671,201 A * 6/1987 Yokoyama ............... B63H 9/10
114/102.19
5,271,351 A * 12/1993 Horiuchi .................. B63H 9/10
114/102.2
5,406,902 A * 4/1995 Heinsohn ................. B63H 9/10
114/102.12
6,308,649 B1* 10/2001 Gedeon ................... B63B 49/00
114/39.11
6,609,471 B1* 8/2003 Carrel ................ B63B 15/0083
114/39.11

(Continued)

FOREIGN PATENT DOCUMENTS

| DE | 3520495 | * 10/1986 |
|---|---|---|
| EP | 2872777 | * 1/2006 |
| FR | 2872777 | * 1/2006 |

OTHER PUBLICATIONS

English Abstract of FR 2872777, Jan. 2006.*
English Abstract of DE 35 20 495, Oct. 1986.*

*Primary Examiner* — Michael P Nghiem
(74) *Attorney, Agent, or Firm* — White-Welker & Welker, LLC; Matthew T. Welker, Esq.

(57) ABSTRACT

The sail force gauge utilizes an electronic system to measure the vectored force of the mainsheet or jib sheet. By gaining the vectored force of the sheet, a relative vectored force upon the sail can be acquired thru simple trigonometric equations. To obtain the vectored force measurement, a multi-axis load cell will measure the force in the lateral and axial directions. These forces can be used to calculate the vectored force of the mainsheet. By knowing the dimensions of the boom length, the sheet block positions, and the vector angle, the resultant angle of the boom can be calculated as well as the perpendicular sail force acting upon the boom. From these calculations, the relative axial force acting upon the boat can be calculated.

18 Claims, 15 Drawing Sheets

(56) References Cited

U.S. PATENT DOCUMENTS

2003/0074978 A1* 4/2003 Bermudez ............... B63H 9/06
  73/828
2010/0121506 A1* 5/2010 Cazzaro ................. B63B 49/00
  701/21

* cited by examiner

ELECTRONIC DEVICE FOR MEASURING THE RELATIVE FORCE ACTING UPON A SAIL

CROSS REFERENCE TO RELATED APPLICATIONS

This application claims priority from U.S. Patent Application Ser. No. 61/582,436, entitled "ELECTRONIC DEVICE FOR MEASURING THE RELATIVE FORCE ACTING UPON A SAIL", filed on 2 Jan. 2012. The benefit under 35 USC § 119(e) of the United States provisional application is hereby claimed, and the aforementioned application is hereby incorporated herein by reference.

FEDERALLY SPONSORED RESEARCH

Not Applicable

SEQUENCE LISTING OR PROGRAM

Not Applicable

TECHNICAL FIELD OF THE INVENTION

The present invention is related to sailing boats. More specifically, the present invention is related to an electronic device for measuring the force acting upon a sail by measuring the angle and force acted upon the sail "sheet" or rope.

BACKGROUND OF THE INVENTION

Sailing is the propulsion of a vehicle and the control of its movement with large (usually fabric) foils called sails. By changing the rigging, rudder, and sometimes the keel or center board, a sailor manages the force of the wind on the sails in order to move the vessel relative to its surrounding medium (typically water, but also land and ice) and change its direction and speed.

Sails on sailboats act as air foils and utilize the wind and force created on the foil to provide forward force for the boat. The force resultant from the sail is based on a number of factors including the speed of the wind, the aerodynamic shape of the sail (foil), and the angle of the sail or foil relative to the wind. Trained sailors with experience understand the balance of these variables. Through manipulation of these variables they attempt to produce the optimal forward force on the boat, which is not readily known to the sailor. Only by gleaning information on how the boat feels, position of simple telltales, or gauging by the relative speed of the boat does the sailor know to adjust the sail setup. The novice attempts to set the sail, but only by guess due to the lack of any performance indication. This provides a barrier to entry for the untrained boater, who would shy away from the experience due to lack of skill.

Definitions

In sailing, a sheet is a line (rope, cable or chain) used to control the movable corner(s) (dews) of a sail.

In most cases, rope is the term used only for raw material. Once a section of rope is designated for a particular purpose on a vessel, it generally is called a line, as in outhaul line or dock line. A very thick line is considered a cable.

Lines that are attached to sails to control their shapes are called sheets, as in mainsheet. If a rope is made of wire, it maintains its rope name as in 'wire rope' halyard.

Lines (generally steel cables) that support masts are stationary and are collectively known as a vessel's standing rigging, and individually as shrouds or stays. The stay running forward from a mast to the bow is called the forestay or headstay. Stays running aft are backstays or after stays.

Moveable lines that control sails or other equipment are known collectively as a vessel's running rigging. Lines that raise sails are called halyards while those that strike them are called downhauls. Lines that adjust (trim) the sails are called sheets. These are often referred to using the name of the sail they control (such as main sheet, or jib sheet).

A boom is a spar (pole), along the foot (bottom) of a fore and aft rigged sail, which greatly improves control of the angle and shape of the sail. The primary action of the boom is to keep the foot of the sail flatter when the sail angle is away from the centerline of the boat. The boom also serves an attachment point for more sophisticated control lines. Because of the improved sail control it is rare to find a non-headsail without a boom. In some modern applications, the sail is rolled up into the boom for storage or reefing (shortening sail).

The genoa or jenny was originally referred to as the 'overlapping jib' or the Genoa jib. It is a type of large jib or staysail used on Bermuda rigged craft that overlaps the main sail, sometimes eliminating it. It is used on single-masted sloops and twin-masted boats such as yawls and ketches. Its large surface area increases the speed of the craft in moderate winds; in high wind conditions a smaller jib is usually substituted, and downwind a spinnaker may be used. The feature that distinguishes a genoa from a jib is that the former extends past the mast, overlapping the mainsail when viewed from the side.

Reefing is a sailing maneuver intended to reduce the area of a sail on a sailboat or sailing ship, which can improve the ship's stability and reduce the risk of capsizing, broaching, or damaging sails or boat hardware in a strong wind.

SUMMARY OF THE INVENTION

The sail force gauge utilizes an electronic system to measure the vectored force of the mainsheet or jib sheet. By gaining the vectored force of the sheet, a relative vectored force upon the sail can be acquired thru simple trigonometric equations. To obtain the vectored force measurement, a multi-axis load cell will measure the force in the lateral and axial directions. These forces can be used to calculate the vectored force of the mainsheet. By knowing the dimensions of the boom length, the sheet block positions, and the vector angle, the resultant angle of the boom can be calculated as well as the perpendicular sail force acting upon the boom. From these calculations, the relative axial force acting upon the boat can be calculated.

This calculated forward force can be displayed as a passive gauge for the sailor to utilize for self-adjustment. It can also be used to calculate the differential measurement of angle and force and where the optimum sail position is by displaying a message to adjust the mainsheets "in" or "out". Wind speed and wind angle can be utilized in the calculations to "learn" the optimum angle of attack for that sail and boat.

The calculated forward force can also be used with automatic sheet winches to automatically adjust the sheet for the optimum forward force or used with an autopilot to self-steer and self-trim during multi course voyages.

Similar sail calculations can be made for non-boom sails (i.e. jib, genoa, spinnaker . . . ) sheets by placing the vectoring load cells on the jib sheet blocks.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION OF THE INVENTION

In the following detailed description of the invention of exemplary embodiments of the invention, reference is made to the accompanying drawings (where like numbers represent like elements), which form a part hereof, and in which is shown by way of illustration specific exemplary embodiments in which the invention may be practiced. These embodiments are described in sufficient detail to enable those skilled in the art to practice the invention, but other embodiments may be utilized and logical, mechanical, electrical, and other changes may be made without departing from the scope of the present invention. The following detailed description is, therefore, not to be taken in a limiting sense, and the scope of the present invention is defined only by the appended claims.

In the following description, numerous specific details are set forth to provide a thorough understanding of the invention. However, it is understood that the invention may be practiced without these specific details. In other instances, well-known structures and techniques known to one of ordinary skill in the art have not been shown in detail in order not to obscure the invention. Referring to the figures, it is possible to see the various major elements constituting the apparatus of the present invention.

Figure 1:
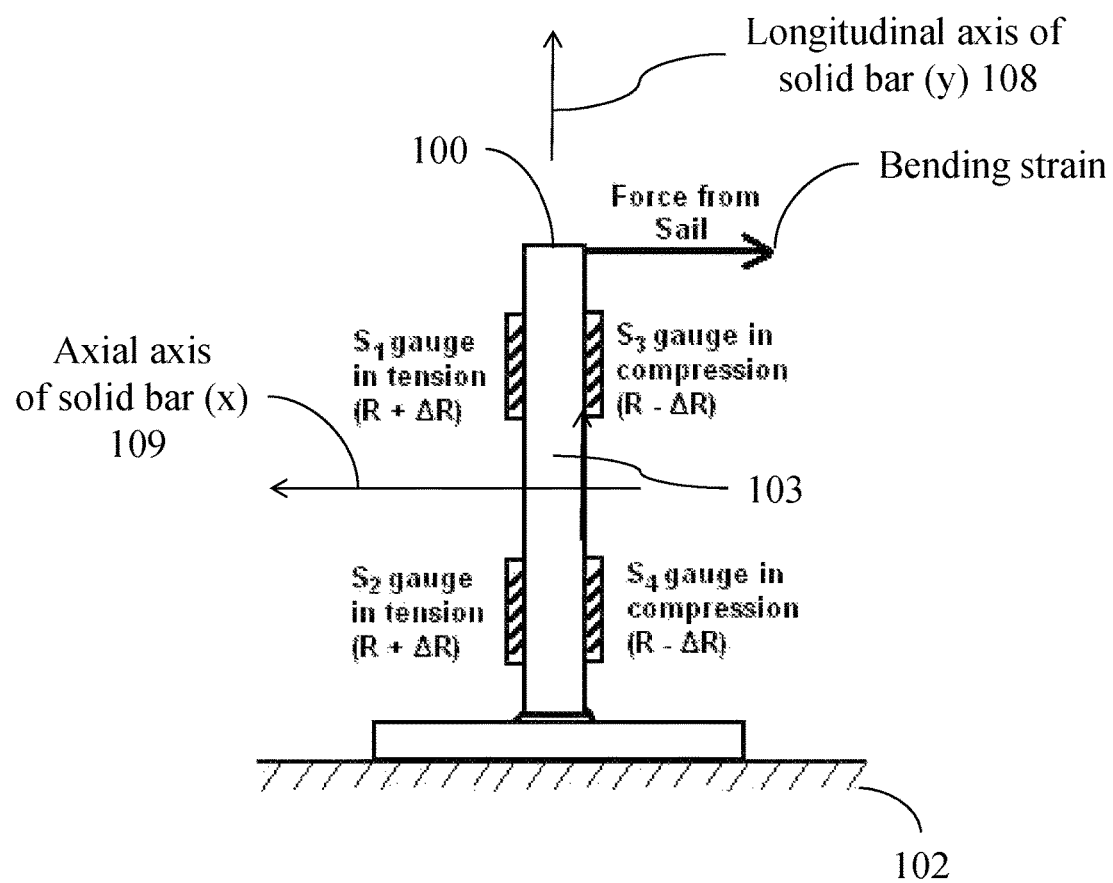
FIG. 1 is a side view of a beam style strain gauge.
Figure 2:
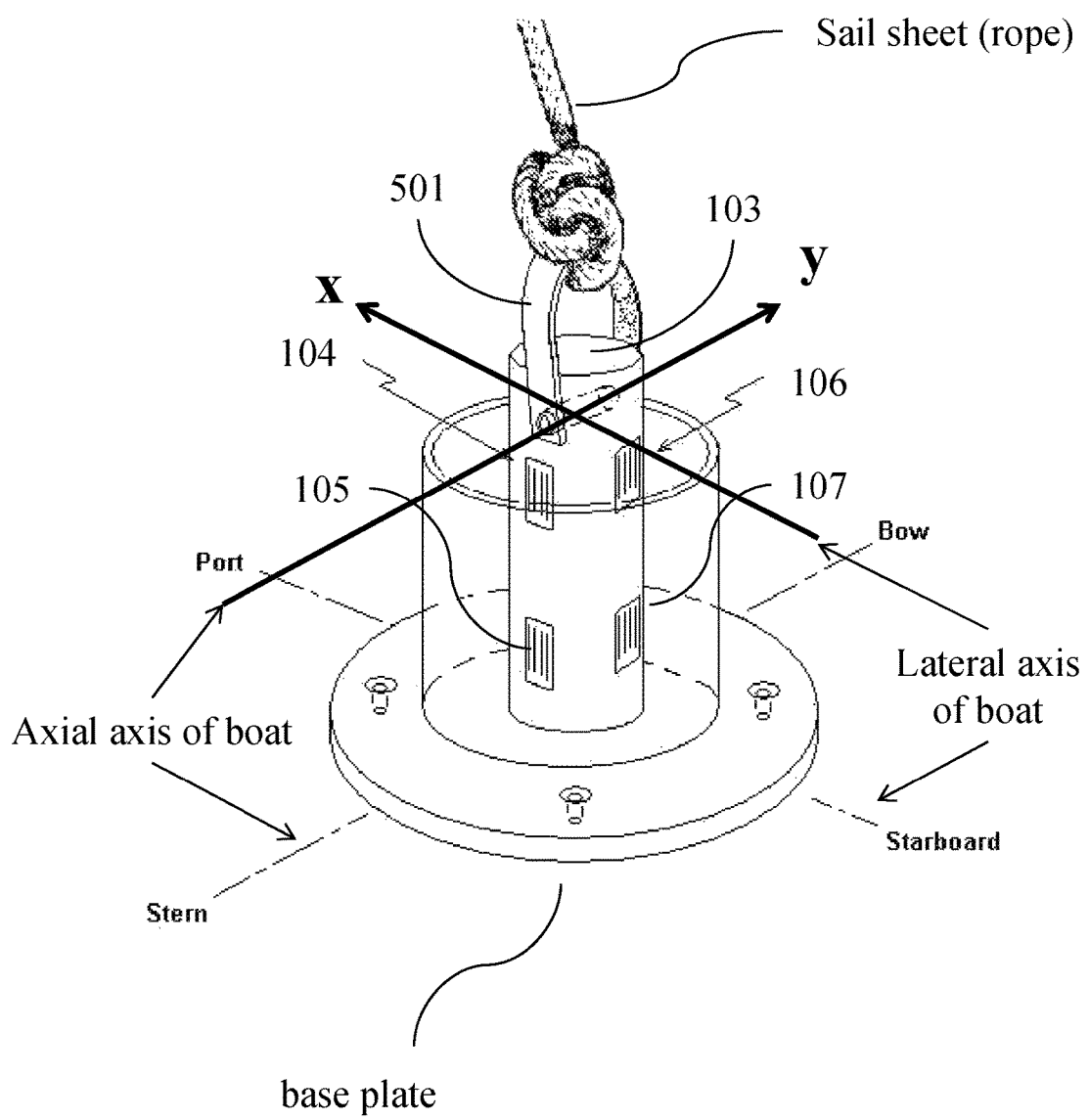
FIG. 2 is a perspective view of the load cell showing the strain gauges mounted on each axis of the rod.

Now referring to FIG. 1, the load cell 100 used by the present invention is a cylindrical beam style load cell 100 mounted vertically, either attached to the boom or the deck 102. The cylindrical load cell 100 is created via a solid bar 103 with strain gauges 104 and 105 on the axial axis (y) of the solid bar 108, and strain gauges 106 and 107 on the lateral (x) axis of the solid bar 109 with the boat as shown in FIG. 2. By placing the strain gauges 104-107 along the axial (y) and lateral axis (x), they independently measure the axial (y) and lateral (x) forces. Each axis force is independent and only acts upon that axis.

Figure 3:
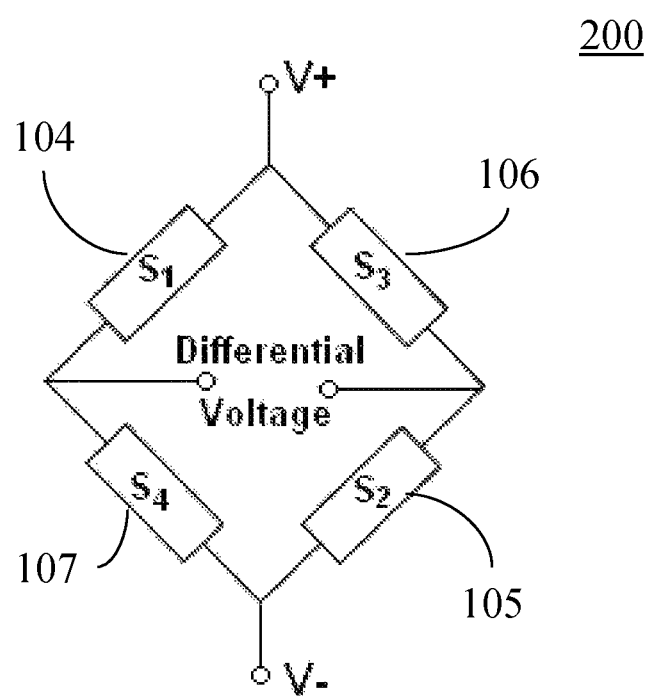
FIG. 3 is a schematic representation of a Wheatstone bridge for each axis of the load cell.
Figure 4:
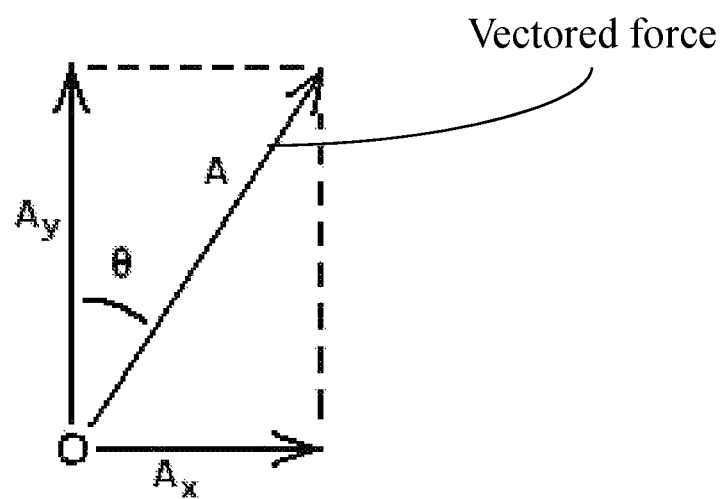
FIG. 4 is a representation of the resultant vector and angle for two forces.

A simple circuit such as a Wheatstone bridge 200 shown in FIG. 3 can be used to read the differential voltage from the strain gauges 104-107. Analog input circuitry can amplify and interpret the differential voltage into a force measurement in the forward and lateral direction for an embedded processor. Using Pythagorean Theorem and basic trigonometry principles as illustrated in FIG. 4, the vectored force (A) and the vector angle θ can be calculated from the axial (Ay) and lateral (Ax) forces measured by the strain gauges 104-107. This information can be displayed on a gauge or digital display 1500, or communicated through a network to other devices or systems on the boat. A display 1500 could visually show the force amount 1505, vector/direction 1506, wind speed 1506, current angle 1504, optimum angle 1503, and instructions 1502 on what action should be taken, such as "let out" or "take in" as well as showing a visual representation of the boat, boom, and sail(s).

Figure 5:
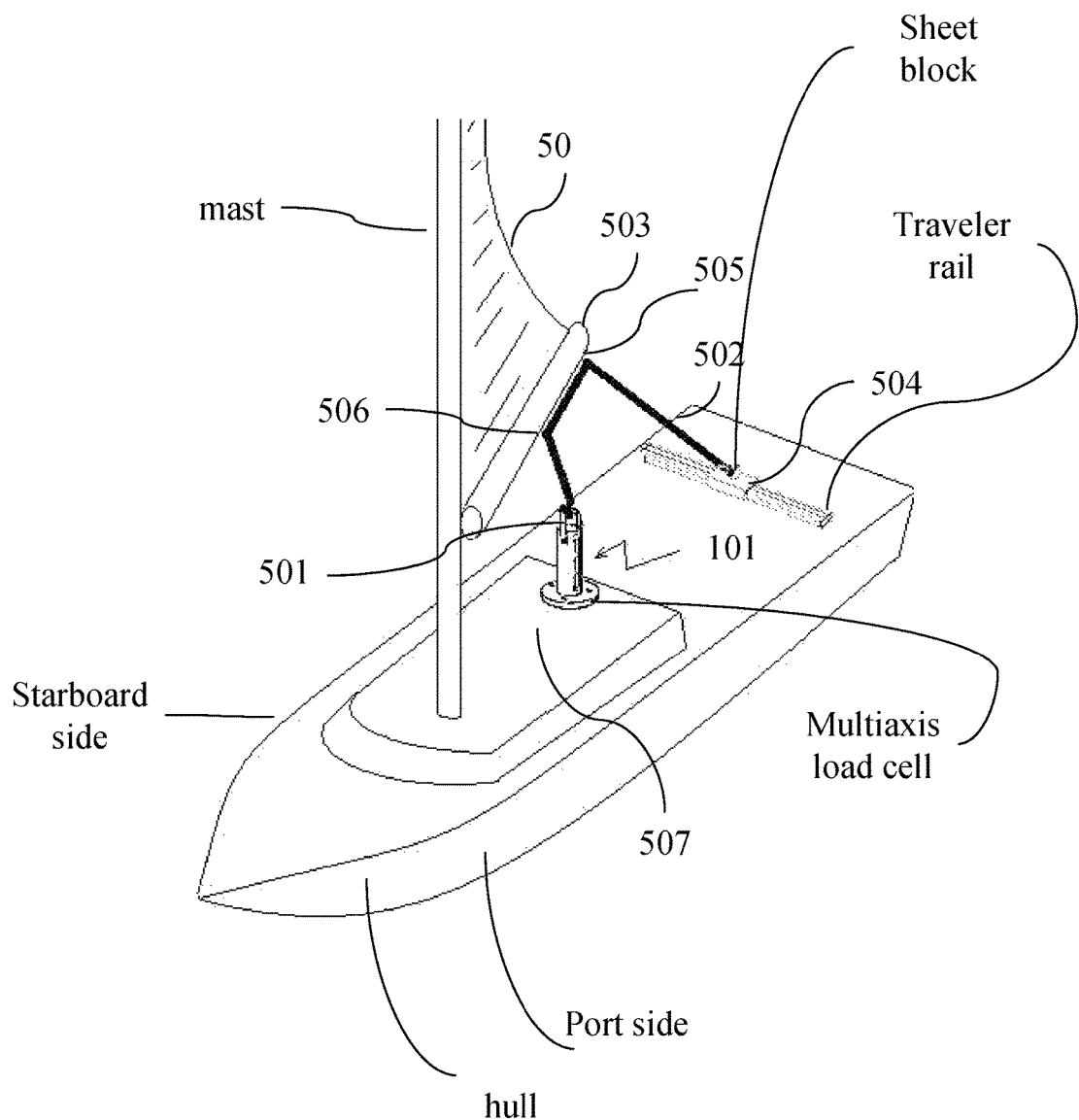
FIG. 5 is a perspective view showing the load cell mounted on the boat and boom sheet attached to it.

Now referring to FIG. 5, in one embodiment, the load cell clevis 501 has the sail sheet 502 affixed to one end, and the other end of the sail sheet 502 is attached to a traveler 504. The sail sheet 502 engages the sail or boom 503 by being attached or strung through one or more loops or points 505 and 506 on the sail or boom 503.

An electronic control system, further comprising an electronic module, electronically measuring axial and lateral forces from the sail sheet rope 502 and using the measured axial and lateral forces from the sail sheet rope 502 to calculate a vectored force and an angle of the sheet relative to the boat hull.

Figure 6:
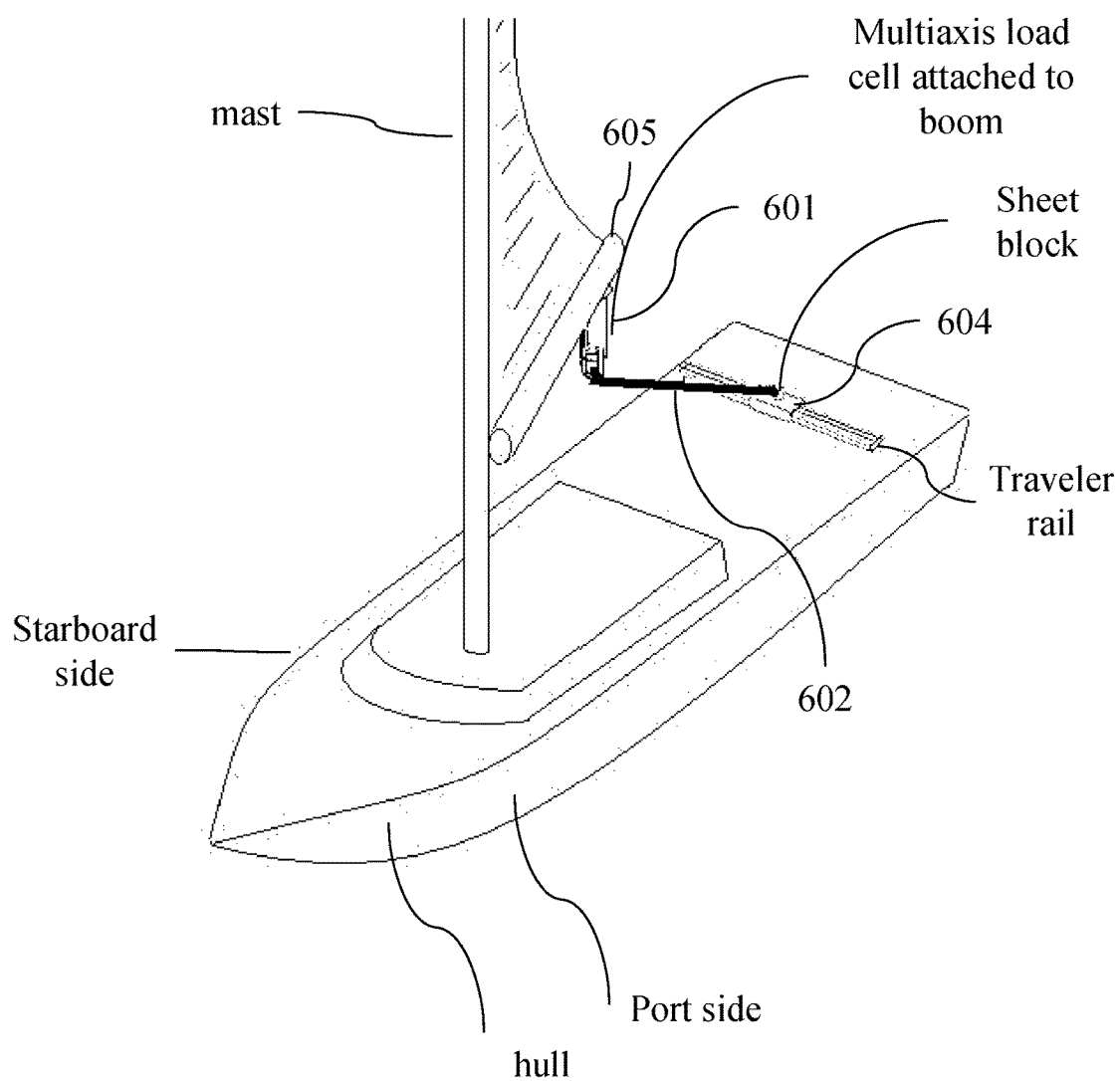
FIG. 6 is a perspective view showing the load cell mounted inverted to the boom and boom sheet attached.

For boom mounted sails, the load cell 601 is mounted to the boom 605 and needs to be mounted to one end of the boom sheet 602 and one end on the traveler 604 as shown in FIG. 6. The load cell 601 can be mounted on the deck 507 as shown in FIG. 5, or inverted on the boom 605 as shown in FIG. 6. To provide the widest range of angular measurement, the deck connection point should be mounted forward of the boom mount.

An electronic control system, further comprising an electronic module, electronically measuring axial and lateral forces from the sail sheet rope 502 and using the measured axial and lateral forces from the sail sheet rope 502 to calculate a vectored force and an angle of the sheet relative to the boat hull.

Figure 7:
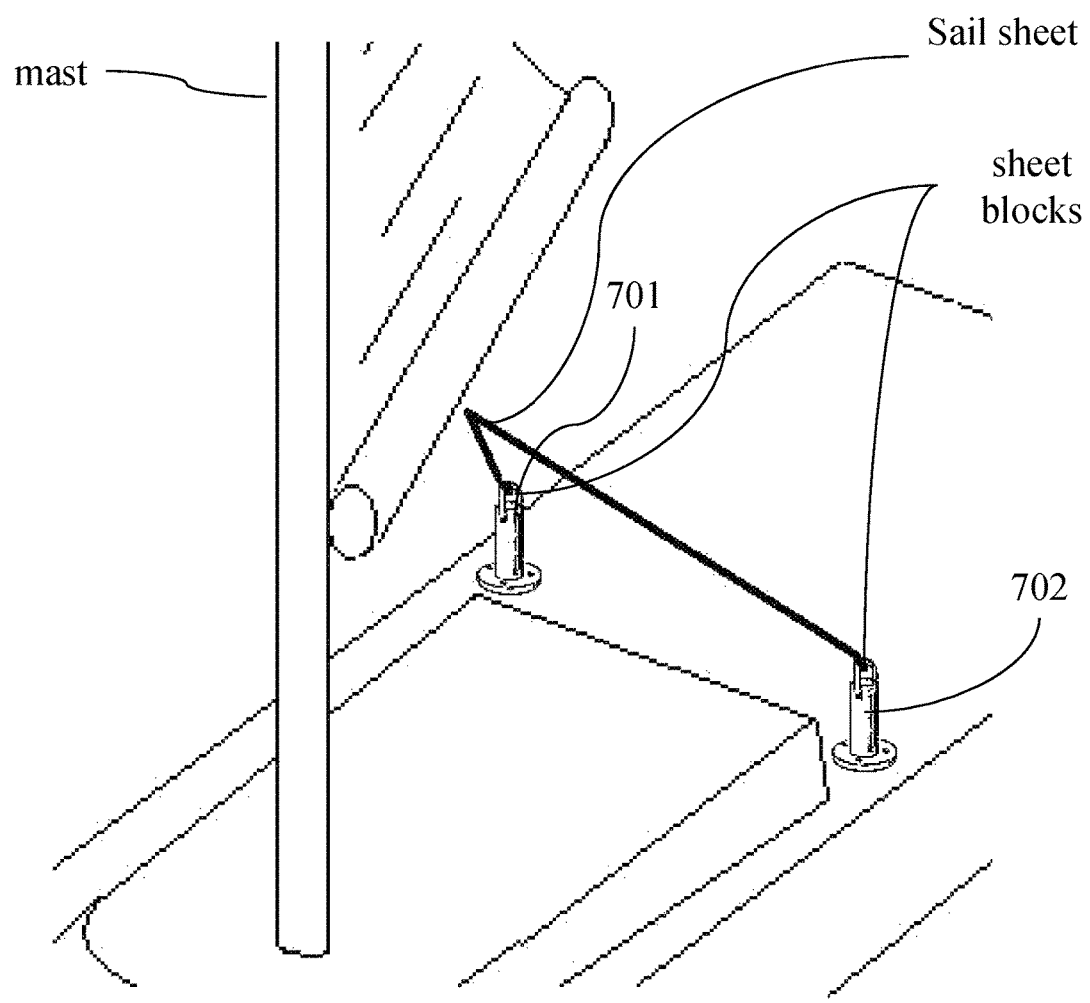
FIG. 7 is a perspective view showing dual load cells mounted and the boom sheet attached.

If multiple sheet blocks are used, two or more load cells 701 and 702 can be used to formulate the force vector. Now referring to FIG. 7, two Wheatstone bridge configurations are connected to electrically produce the resultant force axially and laterally or separate input circuits can be used to calculate the resultant force.

Figure 8:
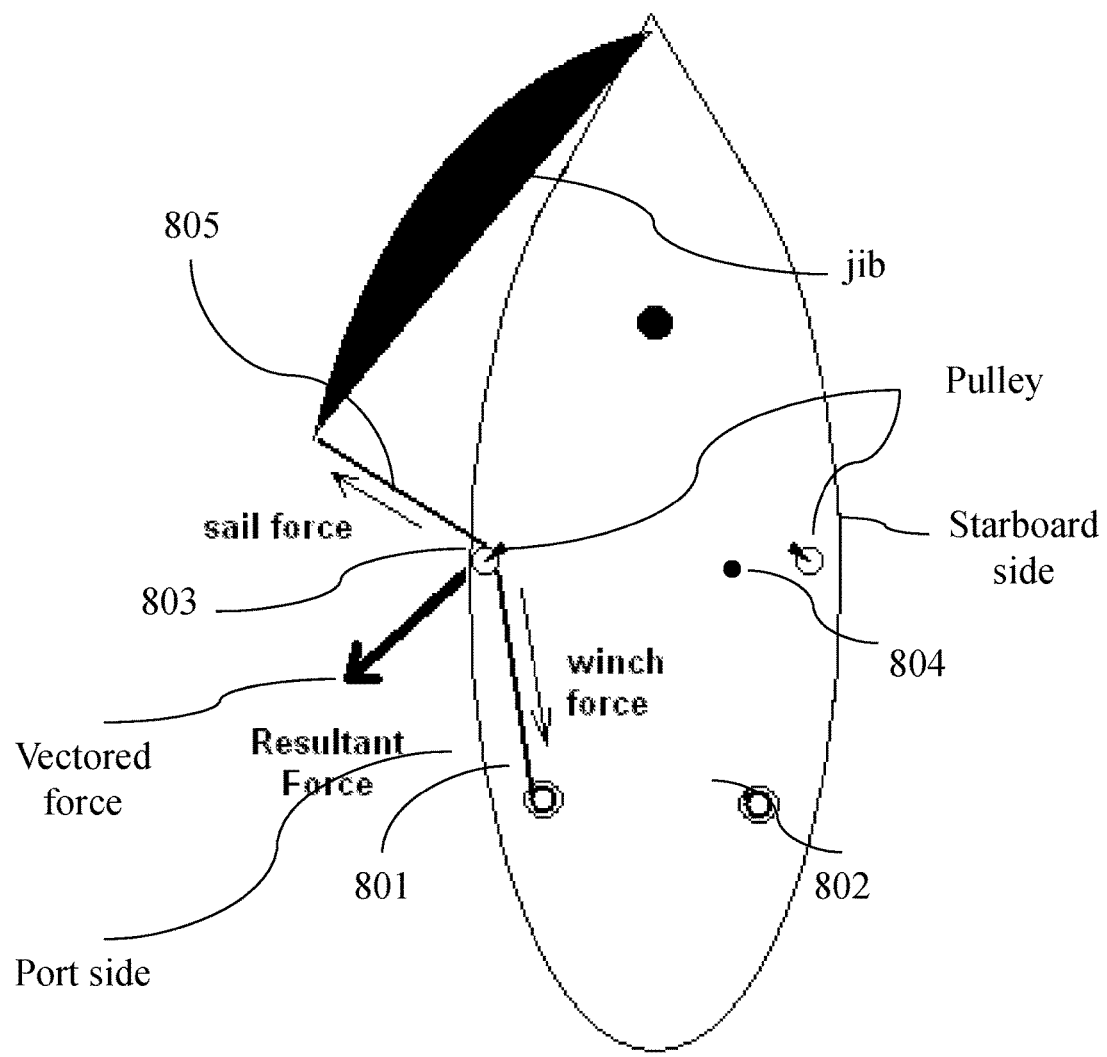
FIG. 8 is a top view representation of the force enacted on the load cell from the jib sail.

In another embodiment, when the present invention is used for jibs 508 or genoas, the sheet block(s) 803 and 804 would be mounted to a vertical load cell on both the port and starboard side. The sheet block(s) 803 and 804 can also be hard mounted as shown or mounted to traveler blocks as shown in other figures. Since the jib sheets and genoa sheets 805 are usually and adjusted by winches, the resultant vectored force is offset due to the position of the winch 801 and 802 relative to the block(s) 803 and 804 as show in FIG. 8

Figure 9:
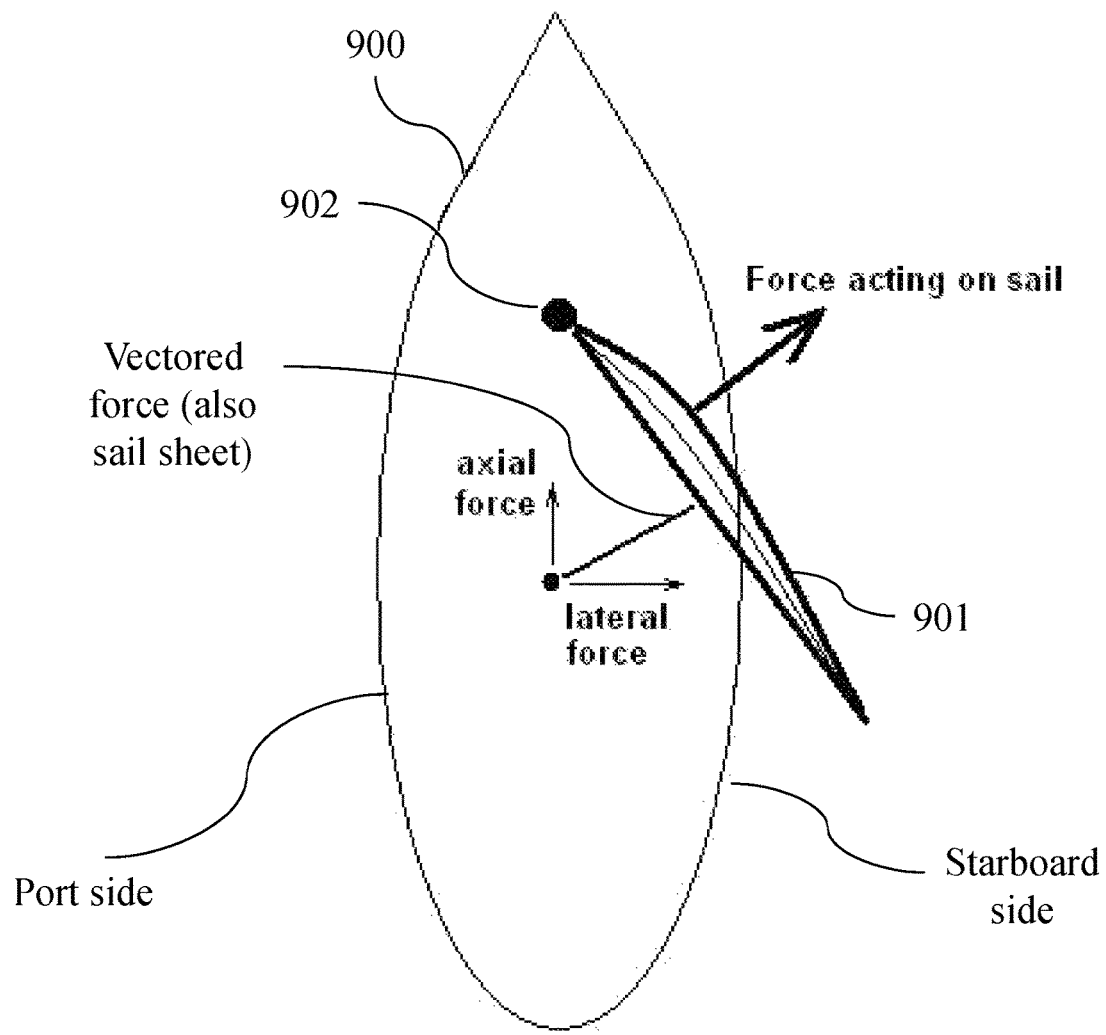
FIG. 9 is a top view representation of the force enacted on the load cell from the sail force.

Now referring to FIG. 9, the force of the sail 901 is transferred to the boat 900 through the mast mount 902, stays, and mainsheet. The mainsheet pull is only relative to the total force, but is linearly proportional to the total force since it is not a fixed end.

Figure 10:
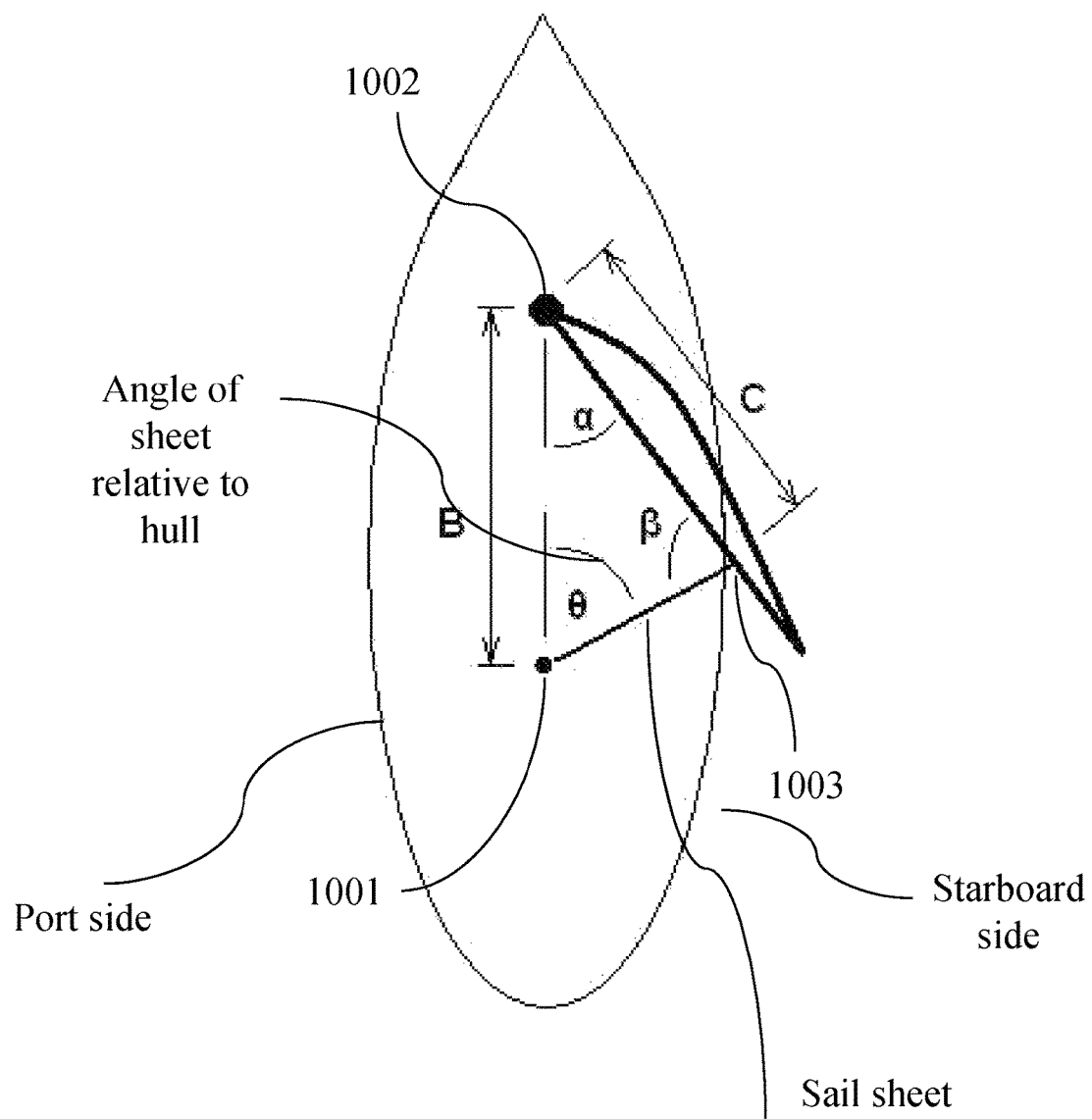
FIG. 10 is a top view representation of the calculation of boom angle with known lengths B and C and angle θ from the load cell.

As illustrated in FIG. 10, the distance from the sheet block 1001 to the mast 1002 is fixed and known as represented by B and the distance from the mast to the boom sheet pin 1003 is known and shown as C. Using the cosine law and the calculated angle of the sheet θ, the angle of the boom α can be determined.

Using the angle of the boom α and the vectored angle of the sheet θ, the relative axial force upon the boat can be calculated. This force is only a fraction of the total force enacted on the boat from the sail; however it is linearly proportional to the total force.

Figure 11:
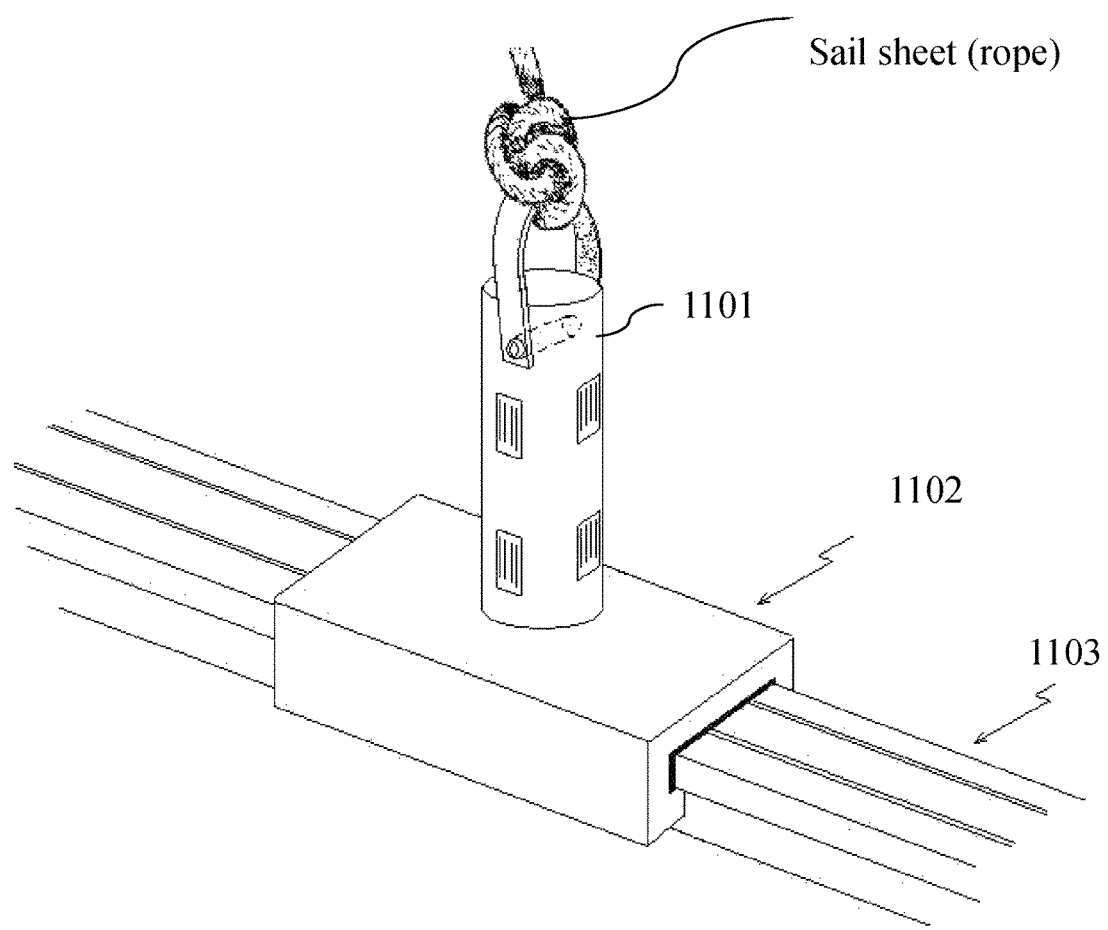
FIG. 11 is a perspective view of a load cell mounted on a sheet traveler.
Figure 12:
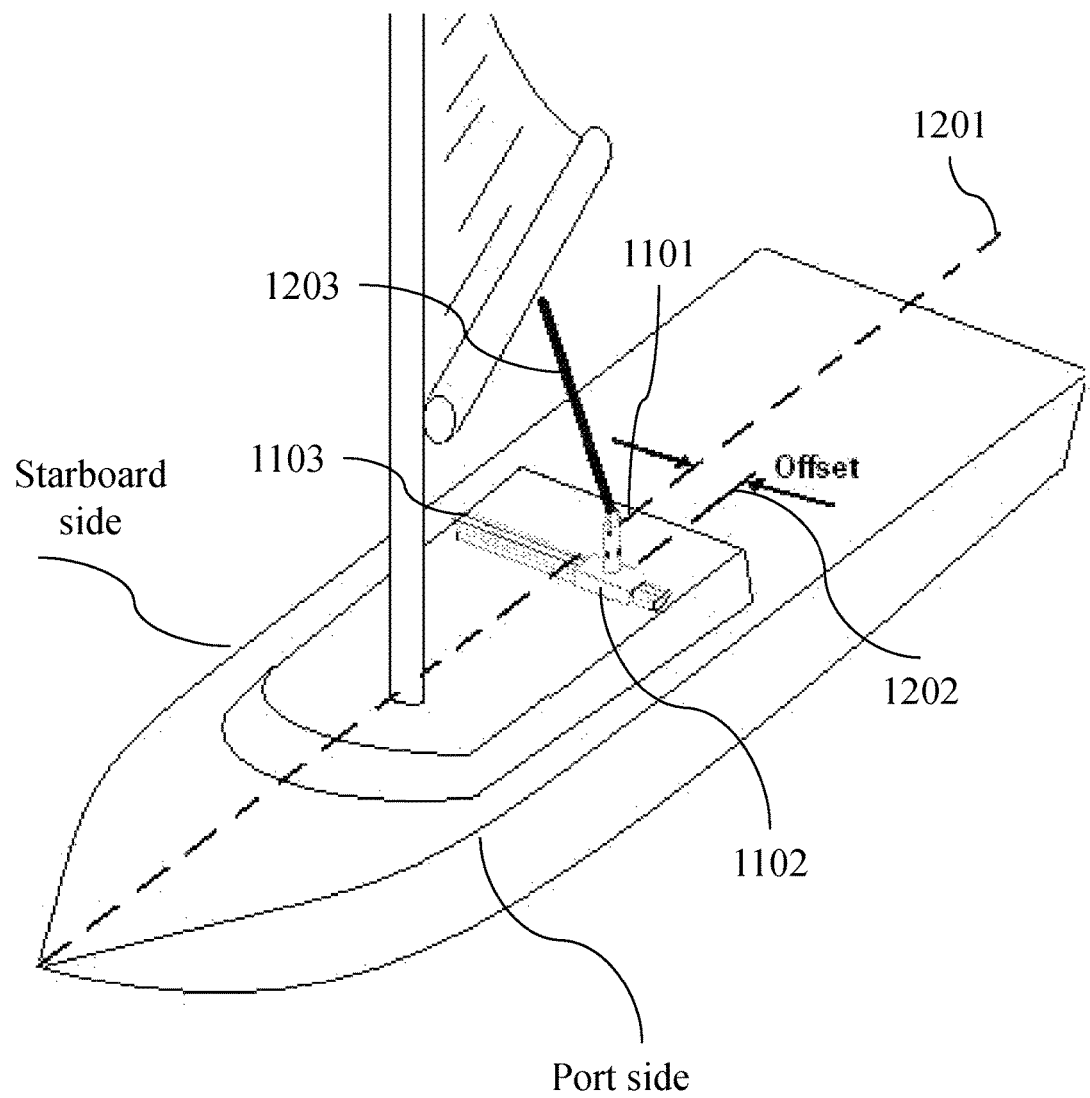
FIG. 12 is a perspective view of the load cell on a traveler offset δ from the centerline.

If the load cell 1101 is mounted to a traveler car 1102 mounted on a travel rail 1103 affixed to the boat as shown in FIG. 11, the angle of the boom α will be offset σ by the traveler car's distance 1202 from a center position down the longitudinal axis of the boat 1201 as shown in FIG. 12.

Figure 15:
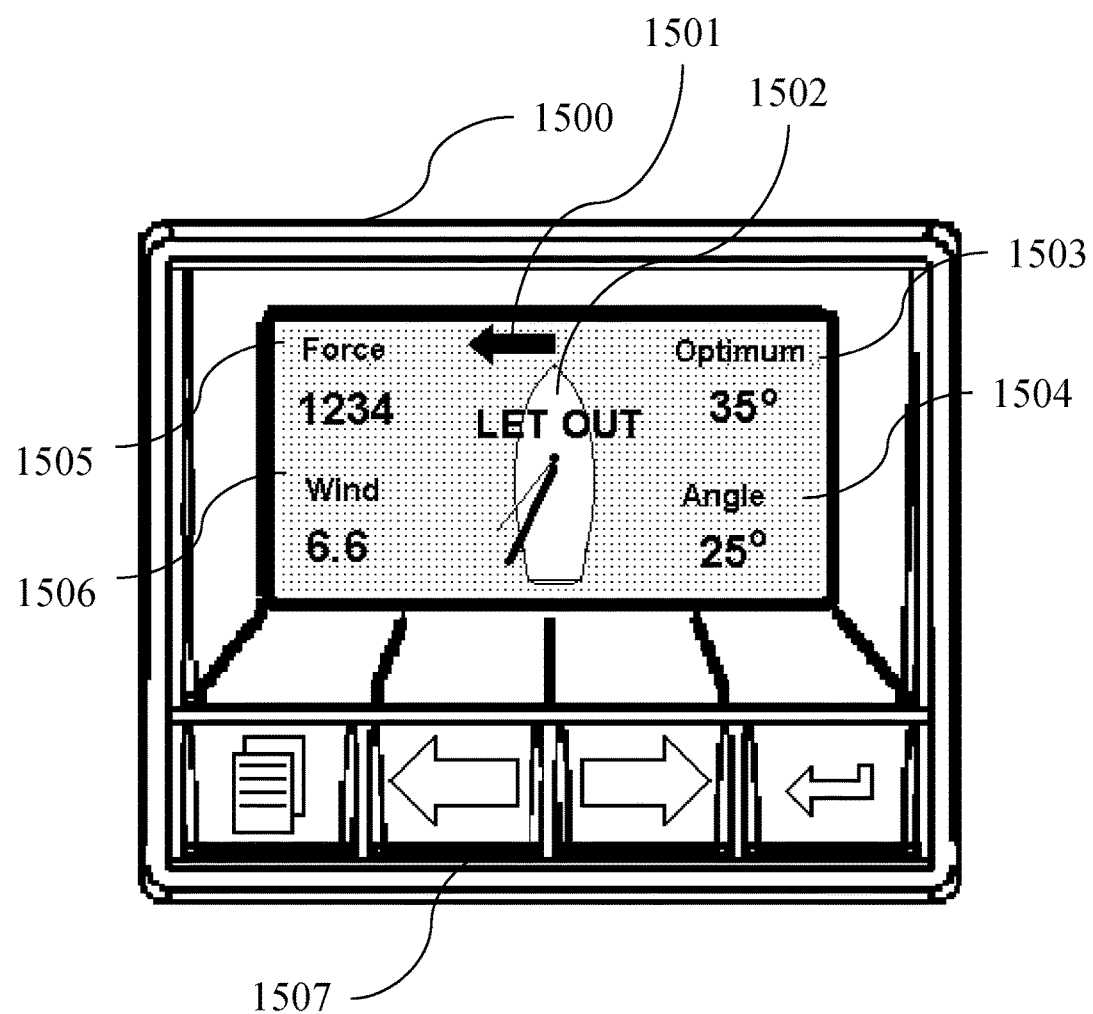
FIG. 15 is an illustrative display layout of the system that could be used in some embodiments.

As the user pulls in or releases the mainsheet 1203, the present invention calculates the angle of the boom σ, and if the forward force is increasing or decreasing. If the angle α is growing, and the forward force is growing, the user is instructed to "let out" the sail, or by an arrow indicator on the display 1500 as shown in FIG. 15. If the force is decreasing and the angle of the boom is growing the user is instructed to "pull in" the sail. If the force is decreasing and the angle is decreasing, the user is instructed to release the sail. The display arrows 1501 show the direction to release or pull in the sail. The display 1500 may also have a navigation panel 1507 for scrolling through the information being displayed comprised of one or more buttons or controls.

Figure 13:
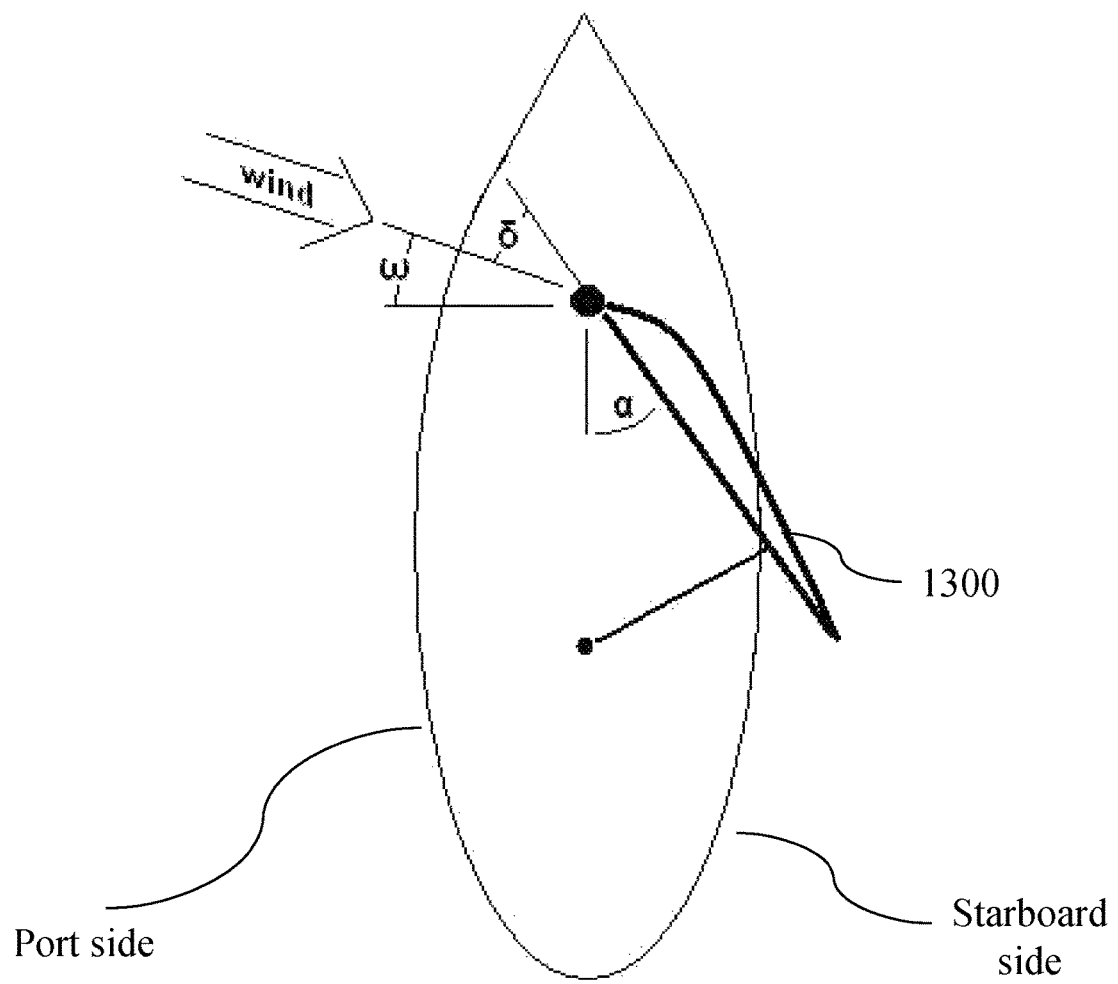
FIG. 13 is a top down representation of the optimum angle δ calculated from the known wind angle ω and known boom angle α.

Each sail type has different properties and performs optimally at different angles ω to the wind. Using separate wind direction sensors along with the calculated boom angle α, the angle of the wind relative to the sail 1300 can be calculated as shown in FIG. 13. Each time the optimum force is calculated, the electronic system can learn the optimum angle of the wind relative to that particular sail, and provide feedback to the operator in terms of the best angle at which to set the sail.

Figure 14:
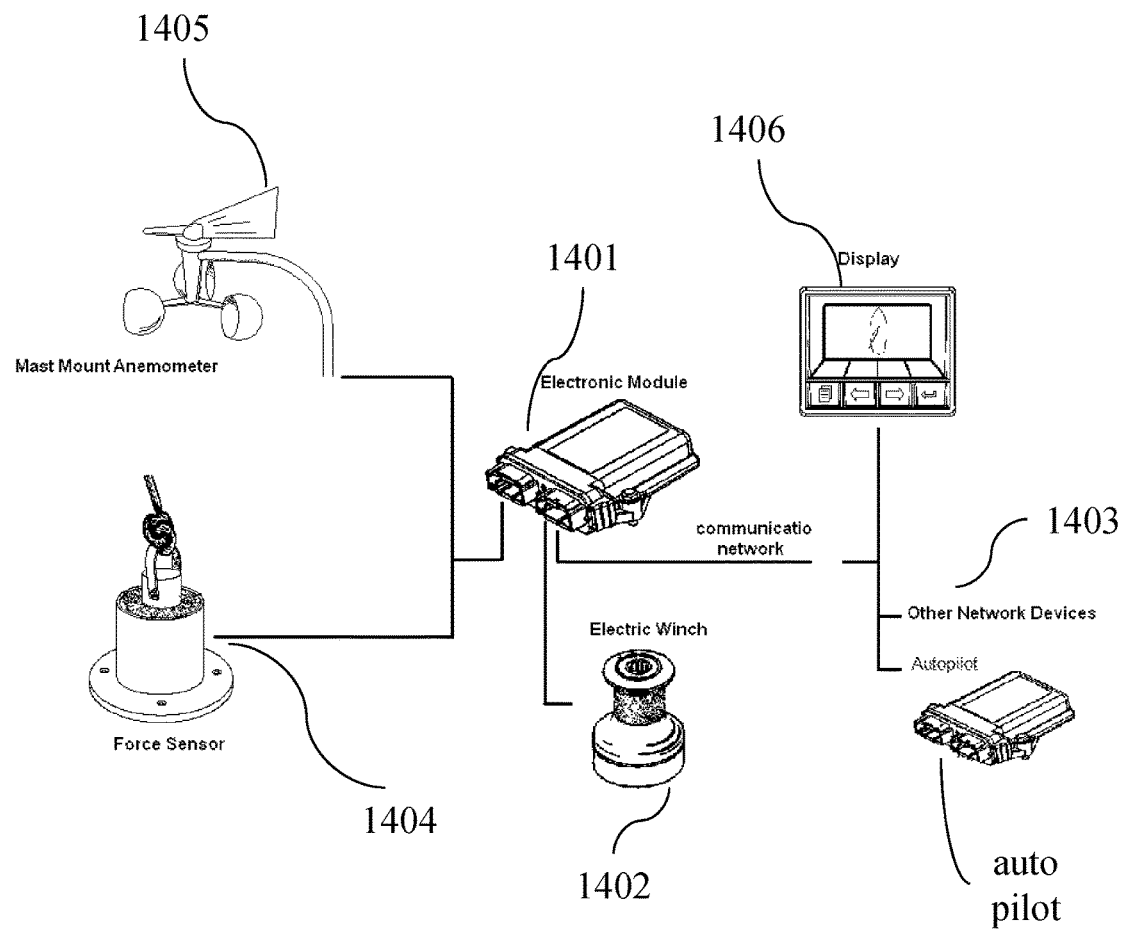
FIG. 14 is a block diagram of the system.

Now referring to FIG. 14, a block diagram represents the components of the present invention for one embodiment. The electronic system uses an electronic module 1401 to calculate the "best angle" to control an electric winch 1402 to reel in the sail or un-reel the sail to the best angle to provide the optimum force and provide a visual display 1406 for operators to view. The electronic system could directly activate a relay to the electric winch 1402, or send a CAN network message to a separate winch control module. Alternatively to adjusting the sail, the electronic system could interface with other network devices 1403 such as an autopilot steering system using NMEA 0183 or 2000 messaging to instruct the autopilot to turn the boat into or away from the apparent wind direction to achieve the best angle of the sail to the wind.

Using a separate wind speed sensor, the normalized force for angle can be calculated by dividing the calculated sail force as provided by the force sensor 1404 by the effective wind speed as provided by one or more mast mounted anemometers 1405. This will improve the ability to calculate optimal angles and optimal sail trim by negating the variable wind speed.

Thus, it is appreciated that the optimum dimensional relationships for the parts of the invention, to include variation in size, materials, shape, form, function, and manner of operation, assembly and use, are deemed readily apparent and obvious to one of ordinary skill in the art, and all equivalent relationships to those illustrated in the drawings and described in the above description are intended to be encompassed by the present invention.

Furthermore, other areas of art may benefit from this method and adjustments to the design are anticipated. Thus, the scope of the invention should be determined by the appended claims and their legal equivalents, rather than by the examples given.

The embodiments of the invention in which an exclusive property or privilege is claimed are defined as follows:

1. A device for measuring a relative force acting upon a sail, comprising:
 a sailboat comprised of a hull and at least one mast, a boom, and the sail, wherein the sail is connected to the at least one mast and the boom;
 a sail sheet rope attached to the hull of the sailboat and the boom;
 a multi-axis load cell attached to the sail sheet rope;
 the sail sheet rope connected to the multi-axis load cell and the boom affixed to the hull;
 the multi-axis load cell
  electronically measuring axial and lateral forces from the sail sheet rope;
  using the measured axial and lateral forces from the sail sheet rope to calculate a vectored force of the sail sheet rope and an angle of the sail sheet rope relative to the boat hull, and
  using the vectored force to acquire the relative force acting upon the sail.

2. The device of claim 1, wherein the multi-axis load cell is further comprised of:
 a solid bar mounted to a base plate;
 a first strain gauge is attached to the solid bar; and
 a second strain gauge is attached to the solid bar and the solid bar is attached to the sailboat.

3. The device of claim 2, further comprising
 a Wheatstone bridge to read a differential voltage from the strain gauges;
 amplifying and interpreting the differential voltage into a force measurement in the forward and lateral direction for an embedded processor;
 using Pythagorean Theorem and basic trigonometry principles where the vectored force and a vector angle can be calculated from the axial and lateral forces measured by the strain gauges; and
 displaying the vector force and the vector angle on a gauge or digital display, or communicating them through a network to other devices or systems on the boat.

4. The device of claim 1, wherein the multi-axis load cell is attached vertically to the boom.

5. The device of claim 4, wherein the multi-axis load cell is further comprised of:
 a clevis; and
 one end of the sail sheet rope is mounted to the clevis on the multi-axis load cell and the sail sheet rope is further mounted to the boom and the other end of the sail sheet rope is attached to a traveler.

6. The device of claim 1, wherein the multi-axis load cell is further comprised of:
a clevis;
the sail sheet rope is affixed to the clevis on one end, and the other end of the sail sheet rope is attached to a traveler; and
the sail sheet rope engages the sail or boom by being attached or strung through one or more points on the sail or boom.

7. The device of claim 6, wherein
the multi-axis load cell is mounted to a traveler car mounted on a travel rail affixed to the boat hull; and
the angle of the boom is offset by the traveler car's distance from a center position down the longitudinal axis of the sailboat.

8. The device of claim 6, wherein one or more sail trimming instructions include providing a warning to reef the sails.

9. The device of claim 1, wherein
a second sail sheet rope with a second multi-axis load cell is affixed to the hull;
the second sail sheet rope connected to the second multi-axis load cell;
the second multi-axis load cell independently measuring axial and lateral forces from second the sail sheet rope;
using the measured axial and lateral forces from each multi-axis load cell of the sail sheet ropes to calculate the first and a second vectored forces and angles of the sail sheet ropes relative to the boat hull; and
two Wheatstone bridge configurations are connected to electrically produce the vectored forces axially and laterally from the two measured axial and lateral forces of each multi-axis load cell of the sail sheet ropes.

10. The device of claim 9, further comprising:
one or more jibs or genoas;
one or more sail sheet ropes are mounted to a vertical load cell on both a port side and starboard side of the hull;
a sail sheet rope is mounted to a corresponding traveler block;
one or more winches adjust the jibs or genoas, and
wherein a vectored force is offset due to a position of the one or more winches relative to the sheet blocks.

11. The device of claim 1, wherein the calculated vectored force and angle of the sail sheet rope is used to calculate an angle of the sail or boom relative to a boat centerline.

12. The device of claim 11, wherein the calculated vectored force and angle of the sail sheet rope and the angle of the sail or boom relative to the boat centerline is used to calculate the relative force acting on the sail.

13. The device of claim 12, wherein the calculated angle of the sail and the relative force acting on the sail is displayed on a gauge or digital display for an operator.

14. The device of claim 12, wherein the calculated angle of the sail is used to calculate sail trimming instructions for an operator to let out or pull in the sail.

15. The device of claim 14, wherein a calculated optimum sail angle relative to wind direction and the one or more calculated sail trimming instructions are transmitted via networked communication to other systems or devices.

16. The device of claim 12, wherein a calculated relative wind force acting on the sail recited is used in combination with wind speed from an anemometer sensor to normalize the relative force acting upon the sail.

17. The device of claim 16, wherein the normalized relative force is calculated by dividing the calculated relative sail force by an effective wind speed.

18. The device of claim 12, wherein the calculated angle of the sail and a calculated relative wind force acting on the sail is used in combination with wind direction from a wind direction sensor to calculate and learn an optimum angle of the sail relative to the wind direction for a particular sail.

* * * * *